S. P. TOWNSEND.
MOWER.
APPLICATION FILED JAN. 27, 1916.

1,245,825.

Patented Nov. 6, 1917.
7 SHEETS—SHEET 1.

Inventor-
Samuel P. Townsend
by his Attorneys
Howson & Howson

S. P. TOWNSEND.
MOWER.
APPLICATION FILED JAN. 27, 1916.

1,245,825.

Patented Nov. 6, 1917.
7 SHEETS—SHEET 2.

Inventor
Samuel P Townsend
by his Attorneys
Howson & Howson

S. P. TOWNSEND.
MOWER.
APPLICATION FILED JAN. 27, 1916.

1,245,825.

Patented Nov. 6, 1917.
7 SHEETS—SHEET 4.

Inventor.
Samuel P Townsend
by his Attorneys.
Howson & Howson

S. P. TOWNSEND.
MOWER.
APPLICATION FILED JAN. 27, 1916.

1,245,825.

Patented Nov. 6, 1917.
7 SHEETS—SHEET 6.

Fig. 8.

Inventor-
Samuel P. Townsend
by his Attorneys.
Howson & Howson

UNITED STATES PATENT OFFICE.

SAMUEL PERCY TOWNSEND, OF ORANGE, NEW JERSEY.

MOWER.

1,245,825.        Specification of Letters Patent.        Patented Nov. 6, 1917.

Application filed January 27, 1916. Serial No. 74,691.

*To all whom it may concern:*

Be it known that I, SAMUEL PERCY TOWNSEND, a citizen of the United States, residing in Orange, Essex county, State of New Jersey, have invented a Mower, of which the following is a specification.

One object of my invention is to provide a machine particularly adapted for cutting grass, which shall include a plurality of mowers arranged to cut a relatively wide swath, it being especially desired that the various parts shall be designed and mounted in a substantial and commercially practical manner, permitting them to automatically and independently adjust themselves to inequalities of the surface of the ground.

Another object of the invention is to provide a grass cutting machine embodying a plurality of mowers in which the framework as well as the driver's seat are supported on wheels independently of said mowers which are propelled by said frame, the invention also contemplating novel mechanism for connecting the mowers to and driving them from the main supporting wheels, while permitting of the independent adjustment of each of them on two axes at right angles to each other.

These objects and other advantageous ends I secure as hereinafter set forth, reference being had to the accompanying drawings, in which.

In Figs. 1 to 7 of the above drawings, 1 indicates the two main supporting wheels of my machine, which are mounted upon short axles 2 (Fig. 4) formed integral with or rigidly attached to casing structures 3, whose outer faces are respectively closed by the disk-like central webs 4 of said wheels. Extending between and rigidly connecting the two casings 3 are two bars 5ª and a beam 5, of which the latter carries upon its central portion the rear ends of a pair of forwardly extending members 6 whose front ends are supported upon a pair of parallel transversely extending beams 7 and 8. Said beams are rigidly connected at intervals by brackets 9 and 10, and of these the former at their forward ends provide bearings for vertical spindles 11 forming part of forks 12 whose lower ends receive spindles 13 for supporting wheels 14.

Figure 2:
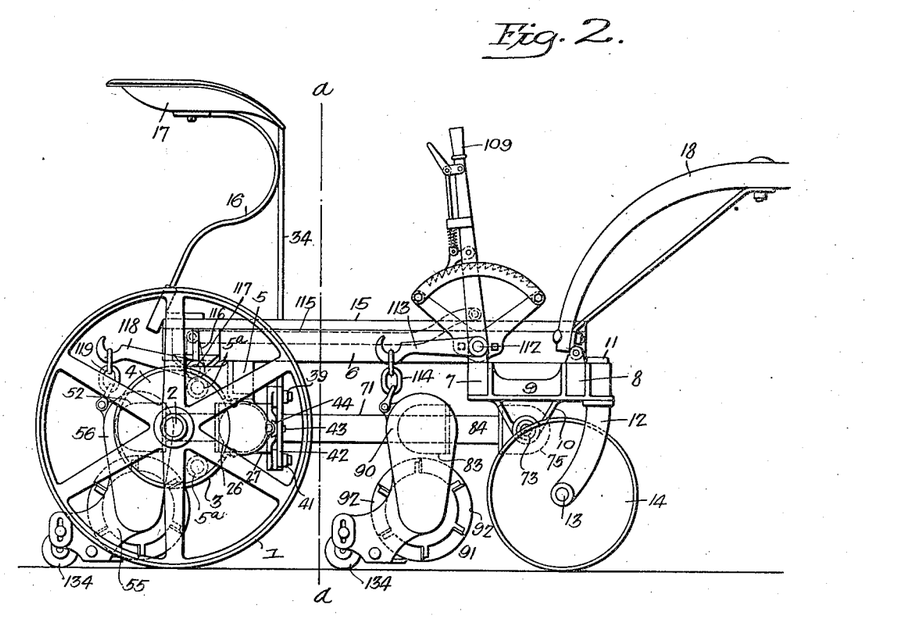
Figure 3:
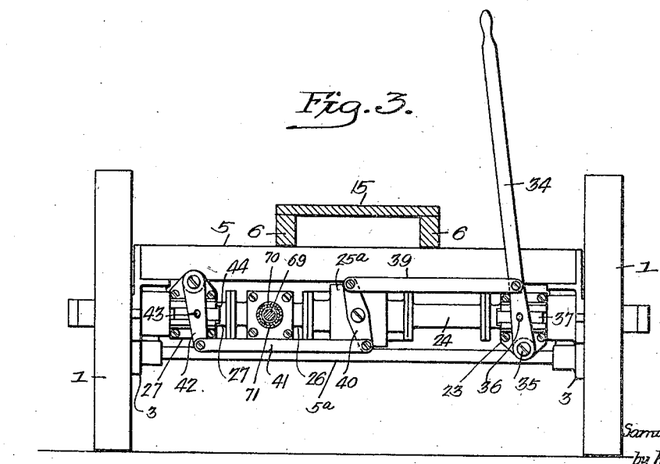
Fig. 3 is a vertical section on the line *a—a*, Fig. 2.

The frame formed by the members 5, 5ª, 6, 7 and 8 with the transverse brackets 9 and 10 is thus supported at its forward end by the wheels 14 and at its rear end is carried by the casings 3 which are supported by the main wheels 1. Mounted on the members 6 is a suitable platform 15 at the rear of which is mounted a spring standard 16 carrying a driver's seat 17, and shafts 18 for the attachment of a horse are suitably connected to the transverse frame member 8, (Fig. 2).

Figure 4:
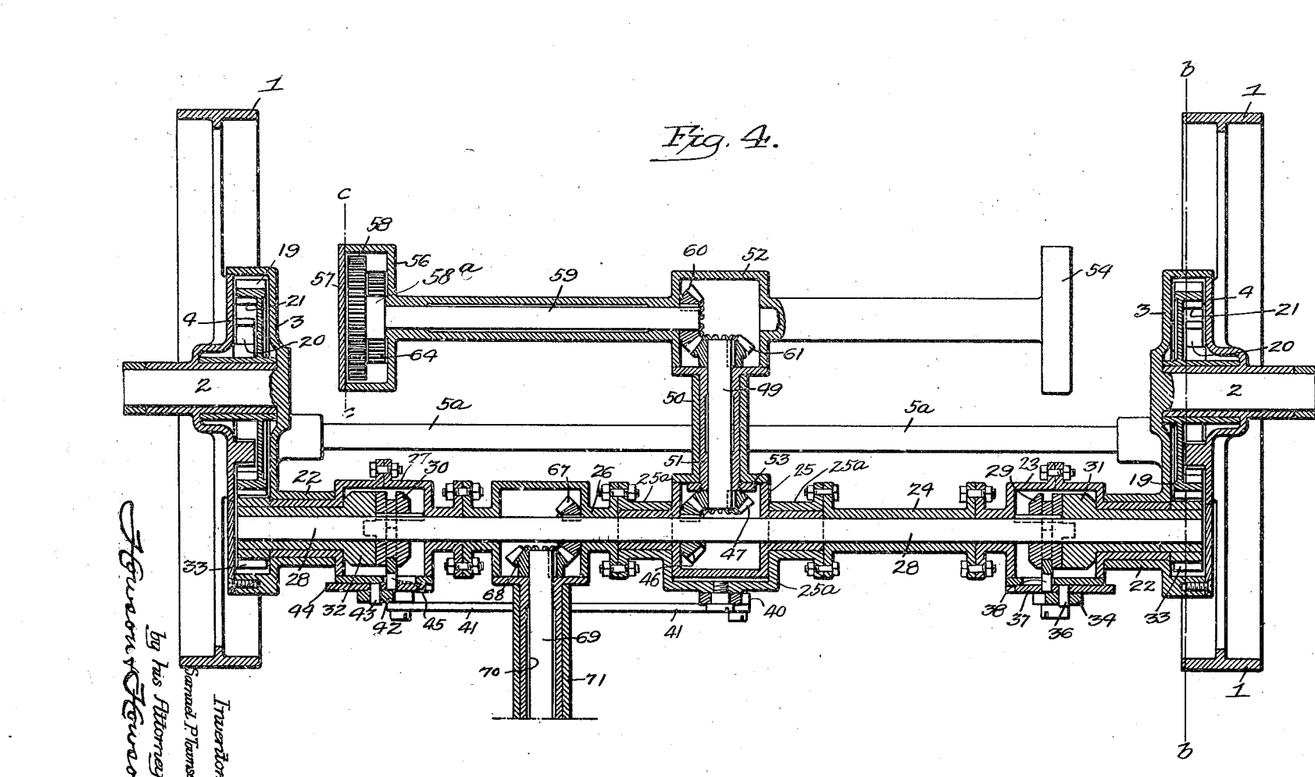
Fig. 4 is a horizontal section taken through the centers of the driving wheels and certain of the mechanism associated therewith.
Figure 5:
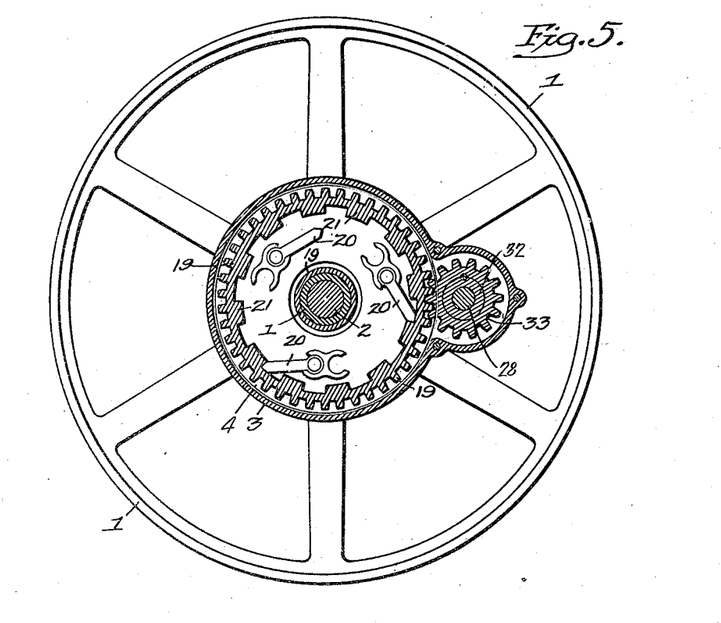
Figs. 5 and 6 are sections on the lines *b—b* and *c—c*, Fig. 4.

From Figs. 4 and 5 it will be noted that the central web 4 of each of the main wheels has within the casing 3 a cylindrical extension concentric with the axle 2 upon which is loosely mounted a gear wheel 19, designed to be operatively connected to its main wheel, when this turns in one direction by gravity pawls 20 pivoted to the web 4 so as to be capable of engaging teeth 21 formed within said gear. The casings 3, Fig. 4, have cylindrical extensions 22 together forming bearings for the opposite ends of a rigid shaft casing preferably though not necessarily made up of a number of sections 23, 24, 25ª, 26 and 27, and so arranged that under operating conditions said casing and its attached parts are capable of a rotary movement. Rotatably mounted within this casing 23—27 is a shaft 28 having splined to it a pair of collars 29 and 30 respectively operative within the sections 23 and 27 which are suitably enlarged to receive them.

The collars 29 and 30 are each provided with teeth designed to coöperate with correspondingly formed recesses in the adjacent ends of sleeves 31 and 32 loosely mounted upon the opposite ends of the shaft 28 and respectively extending into the interior of the casings 3 where each of them has fixed to it a pinion 33, meshing with the teeth of the gear 19. The members 29—31 and 30—32 thus constitute a pair of clutches whereby power may be transmitted from the wheels 1 to the shaft 28 and for operating said clutches I provide a lever 34 pivoted on a suitable part of the frame as at 35. This lever is connected by a pin 36, slide 37 and a second pin 38 with the collar 29, and is likewise connected to the second collar 30 through a link 39, a lever 40, a second link 41 and a lever 42, to a pin 43 on a slide 44 which in turn is connected through a pin 45 with said collar. With this arrangement a movement of the lever 34 in either direction simultaneously operates both of the clutches 29—31 and 30—32.

The shaft casing section 25ª is designed to provide bearings for the opposite ends of a casing 25 within which is a beveled gear 46 keyed to the shaft 28 and meshing with a second beveled gear 47 which in turn is fixed to a rearwardly extending shaft 49, it being noted that said casing 25 is free to rotate about the shaft 28 independently of the casing 23—27. This enlargement of said shaft casing section has a rearwardly extending sleeve portion 50 within which is rotatably mounted a second sleeve 51 extended from and rigidly connected to a hollow enlarged portion of a second shaft casing 52 which extends substantially parallel with the shaft 28 and its casing. The sleeve 51 is prevented from withdrawal from the sleeve 50 by a nut 53 within the hollow of the section 25 and provides bearings for the rearwardly extending shaft 49. The casing structure 52 at one end is provided with a downward extension 54 to whose lower end is pivotally connected one side of a mower 55 whose opposite side is likewise pivotally connected to a downward extension 56 from the opposite end of said structure. This latter extension however is made hollow with a removable cover 57, and the structure 52 between its hollow enlargement and this latter extension is tubular, providing bearings for a shaft 59. By means of two coacting beveled gears 60 and 61, one end of this shaft is operatively connected to the shaft 49, while its other end has fixed to it a spur gear 58. The reel shaft 62 of this mower 55 has fixed to it a gear 63 connected, through a gear 64, a short spindle 65 and a gear 66, with the gear 58, which with said elements lie within the extension 56 as shown in Figs. 4 and 6; said gear being properly positioned by a hub or collar 58ª on the shaft 59 within said extension.

The shaft 28, in addition to the beveled gear 46, has fixed to it a second beveled gear 67 which is mounted within a hollow enlargement of the shaft casing section 26 where it meshes with a second beveled gear 68 fixed to a forwardly extending shaft 69. This enlargement of said shaft section has a forwardly projecting sleeve extension 70 providing bearings for the shaft 69 and has rotatably mounted upon it a second sleeve 71 fixed rigidly to a gear casing 72 through which passes a front transverse shaft 73. Said casing 72 is rotatably mounted in bearings 74 provided by two of the frame members 10, others of which on either side of it likewise rotatably support two other gear casings 75 and 76, into both of which the shaft 73 extends. The longitudinally extending shaft 69 has fixed to it a beveled gear 77 and the transverse shaft 73 has a beveled gear 78 meshing with said first gear. Said shaft 73 within the casing 75 has fixed to it a beveled gear 79 meshing with a second beveled gear 80 fixed to a short rearwardly extending shaft 81 journaled in bearings provided by a sleeve 82 rigidly connected to and projecting from a casing 83. This sleeve is rotatable within a second sleeve 84 projecting from the casing 75 and is retained in place by a nut 85 within the latter.

Figure 6:
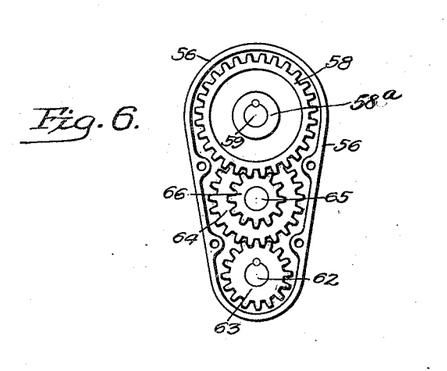

Fixed to the shaft 81 within the casing 83 is a beveled gear 86 meshing with a second beveled gear 87, in turn fixed to a shaft 88 extending through a sleeve 89 formed as part of said casing and terminating in a gear case 90 serving as an inclosure for a train of gears similar to those shown in Fig. 6, whereby the reel 92 of a mower 91 is driven. The opposite end of said mower is connected to and suspended by a plate 93 similar to the plate 54 of the mower 55, and forming part of or rigidly connected to the casing structure 83.

A third mower 94, transversely in line with the mower 91, is likewise driven from the transverse shaft 73, which within the casing 76 has fixed to it a beveled gear 95 meshing with a second beveled gear 96, in turn fixed to a short longitudinally extending shaft 97. The latter within a gear casing 98 has fixed to it a second beveled gear 99 meshing with another beveled gear 100, fixed to a transverse shaft 101 journaled within an extension from said gear casing. This shaft 101 enters a gear case 102 wherein are mounted a train of gears also similar to those shown in Fig. 6, connecting it to the driving shaft of the reel 103 of the mower 94.

The casing 98 likewise has a forwardly extending sleeve 105 rotatable within a sleeve 106 projecting from the casing 76, in which it is held by a nut threaded upon it so that the mowers 94 and 91 are free to turn on axes coincident with the center lines of the shafts 97 and 81 respectively. Moreover both of these forward mowers are also free to turn on the shaft 73 as an axis and they are spaced apart a distance which roughly is about three-fourths the length of the reel of the mower 55, which is so mounted behind them as to cut the otherwise uncut swath between them.

Mounted on the forward portion of the frame of the machine, within easy reach of a driver on the seat 17, are three levers 109, 110 and 111, the first of which is mounted on a shaft 112 carried in suitable brackets projecting from the frame member 7 and has fixed to it a pair of hooked arms 113 connected through chains 114 with lugs on the rear upper portions of the gear case 90 and plate 93 respectively of the mower 91. Similarly the second lever 110 is connected through a link 115 and an arm 116 (Fig. 1) to a transverse shaft 117 on which are fixed a pair of arms 118 connected through chains 119 with the casing 56 and plate 54 of the mower 55. The lever 111 is fixed to a shaft 120 which, like the shaft 112, is carried in bearings on the frame members 7 and has fixed to it a pair of projecting arms 121 connected through chains 122 with the gear case 102 and the corresponding side plate of the mower 94.

All of the above noted levers with their connections are independent of each other and each of them is provided with a notched quadrant with a corresponding locking pawl so that either or both of the mowers 91 and 94 may be turned about the shaft 73 as an axis and held in a raised and inoperative position. Similarly by means of the lever 110 the mower 55 may be swung upwardly around the shaft 28 and locked in its raised or inoperative position, the shaft 117 carrying the arms 118 for raising this mower being supported in bearings projecting laterally from the side members 6 of the frame.

Under conditions of operation the three mowers together cut a relatively wide swath, being so connected to the main frame that while each of them is free to independently turn on two substantially horizontal axes at right angles to each other so as to accommodate itself to any variations in or obstructions upon the surface of the ground, they cannot turn on vertical axes relatively to each other but remain in such positions that the line of the reels of the two forward mowers is at all times practically parallel with the line of the reel of the rear mower.

Figure 8:
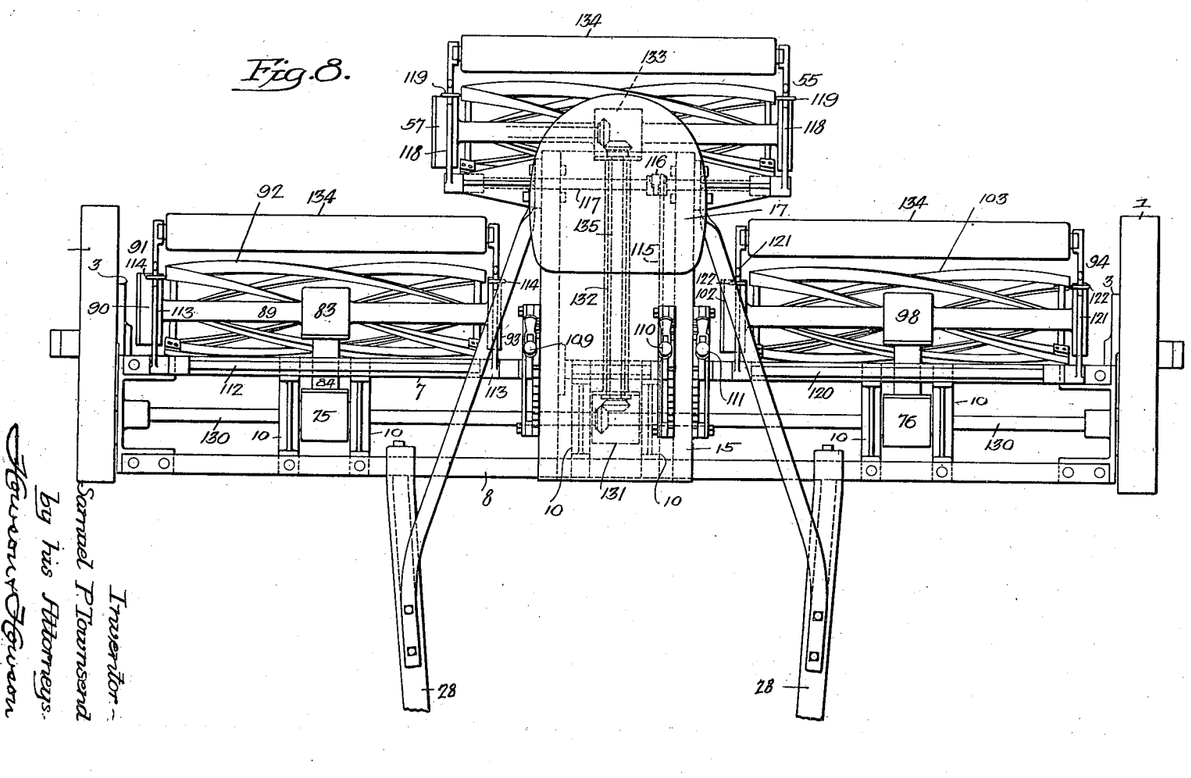
Figs. 8 and 9 are respectively a plan and an end elevation of a modified form of my invention in which the frame and the driver's seat are supported upon a single pair of wheels.
Figure 9:
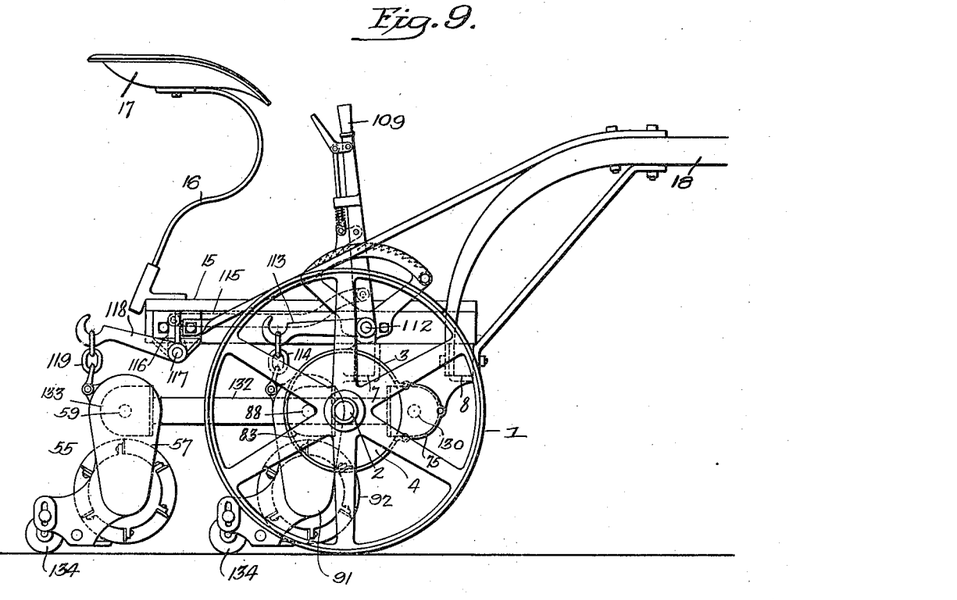

As shown in Figs. 8 and 9, I may without departing from my invention do away with the front supporting wheels 14 and carry the frame with the driver's seat, etc., upon the main driving wheels 1. In this case said main wheels are equipped with driving gears as shown in Figs. 4 and 5, but the pinion 33 of each wheel is fixed to a main transverse shaft 130, similar to the shaft 73, Fig. 1, and extending into the casings 75 and 76 containing the driving gears for the mowers 91 and 94.

Figure 1:
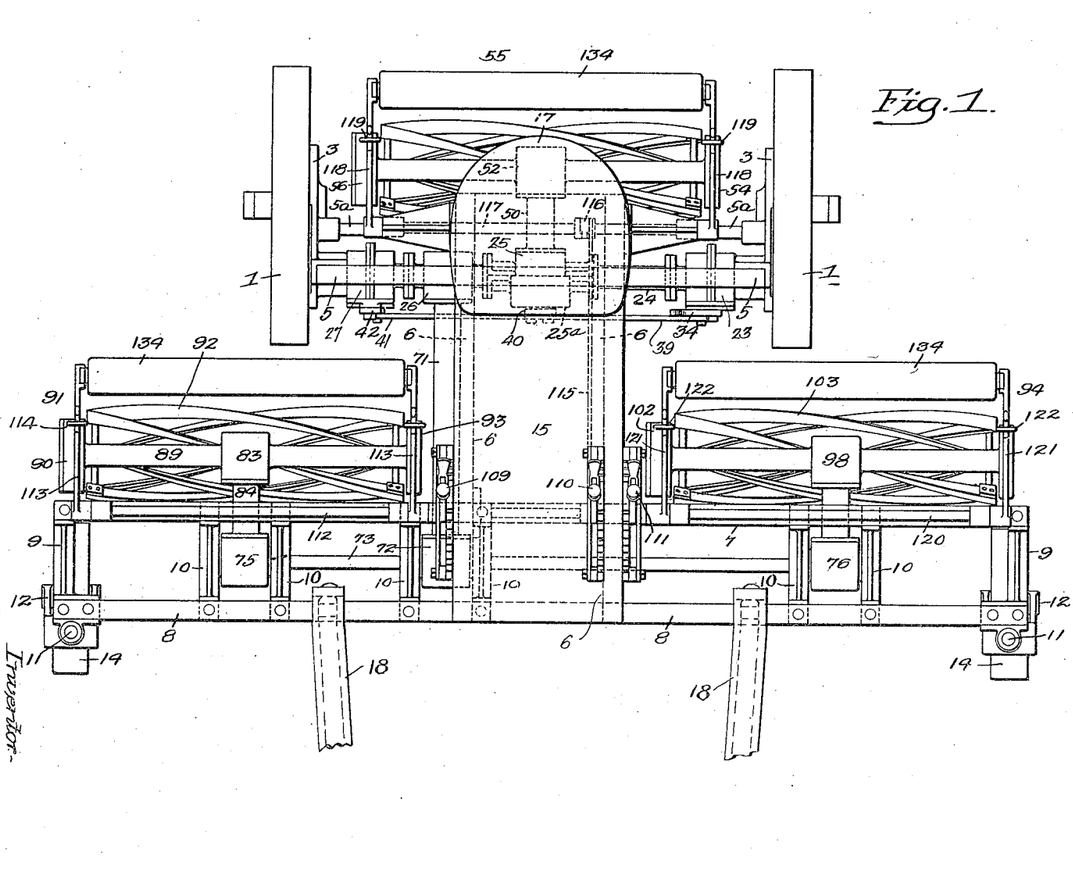
Figures 1 and 2 are respectively a plan and a side elevation of a machine constructed according to my invention.
Figure 7:
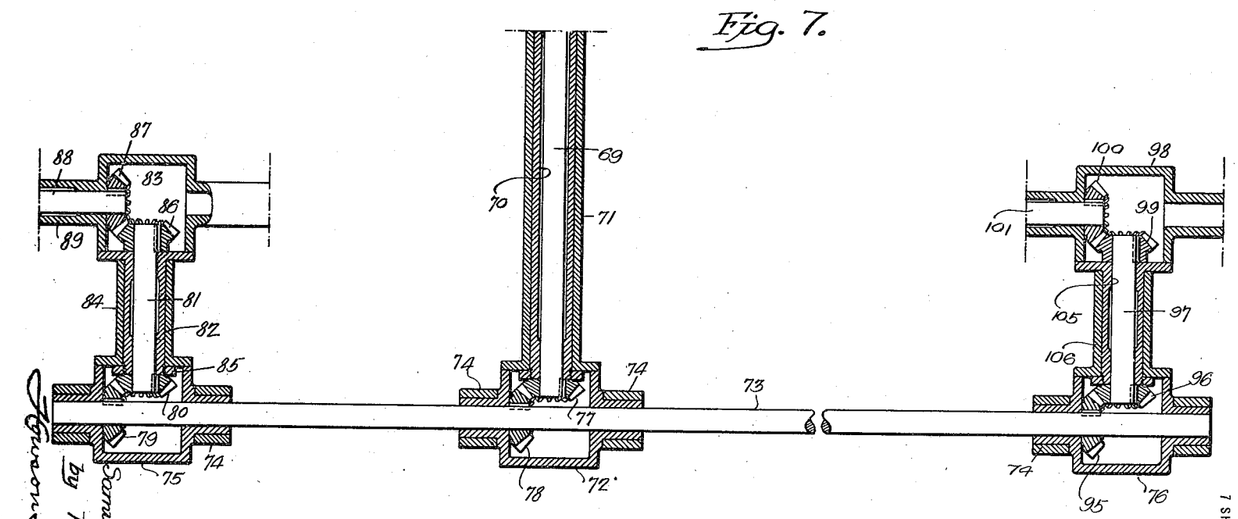
Fig. 7 is a horizontal section taken through the driving mechanism of the forward mowers.

The mechanism for actuating these two machines is identical with that shown in Figs. 1 and 7, for as before, the main transverse shaft passes through a third casing 131 similar to the casing 72 except that its rearwardly projecting sleeve 132 extends to the casing 133, which except for the length of its forwardly projecting sleeve within the sleeve 132, is identical in construction with the casing 52, Fig. 4.

Within these two sleeves is journaled a rearwardly extending shaft 135 which, through gearing in the casing 133 and in the gear case 57, actuates the rear mower 55 in the manner previously described. The lever 110 is connected through a link 115 with an arm fixed to the transverse pivot shaft 117 and when said lever is operated to raise the mower 55, the latter swings about the shaft 130 as an axis as do also the two mowers 91 and 94. In this case the three mowers occupy the same relative positions as in the other form of my invention except that the rear mower is somewhat closer to the mowers 91 and 94.

It is particularly to be noted that by means of the construction above described, each of the mowers is free to turn on two axes at right angles to each other while being held by a relatively rigid structure so that the axes of their reels at all times lie within substantially parallel vertical planes, the mowers being held in approximately the same relative positions although being free to move independently up or down and to rotate on axes at right angles to the lines of their reels, without departing materially from such comparatively fixed relationship.

It will be further noted that all of the mowers while having their cutting members actuated from the main driving wheels, are supported partly from said wheels through the main frame and partly by their respective grass rollers 134.

In that form of the invention shown in Figs. 1 to 7, the force necessary for moving the rear mower is to a large extent transmitted through the rigid casing structure 23—27 to the structures 3 and to the wheels, rather than through the shaft 28, for while the casing 25 is free to turn about said shaft, the force for pulling or otherwise moving the rear mower is transmitted from the structures 50 and 25 to the structure 25$^a$.

I claim:—

1. The combination in a mowing machine of supporting wheels; a frame mounted thereon; with a plurality of structurally independent mowers having their cutting elements driven from at least one of said wheels, the forward portions of the mowers being supported by the frame and their rear portions resting on the ground.

2. The combination in a mowing machine of supporting wheels; a frame mounted thereon; a plurality of independently operated mowers having their cutting elements driven from at least one of said wheels and each including a grass roller supporting a portion of its weight; with means for supporting the remainder of the weight of each mower from the frame.

3. The combination in a mowing machine of a single pair of driving wheels; a plurality of structurally independent mowers having their cutting elements actuated from at least one of said wheels; and means for preventing relative movement of said mowers in a substantially horizontal plane, including devices permitting independent rotation of said mowers about either of two lines at right angles to each other.

4. The combination in a mowing machine of a pair of driving wheels; two mowers substantially in line with each other; a third mower to the rear of said first mowers; means for operating said mowers from at least one of the driving wheels; and means for holding all of said mowers in the same relative positions in one plane while permitting each of them to turn on two axes at right angles to each other.

5. The combination in a mowing machine of a pair of driving wheels; two mowers substantially in line with each other; a third mower to the rear of said first mowers; means for operating said mowers from at least one of the driving wheels; and means for holding all of said mowers in the same relative positions in substantially parallel planes while permitting each of them to turn on two axes at right angles to each other; the same consisting of structures mounted on portions of the operating means for each mower so as to turn thereon; and two concentric relatively rotatable sleeves for each mower respectively connected to said structures.

6. The combination in a mowing machine of a pair of driving wheels; two mowers substantially in line with each other; a third mower to the rear of said first mowers; a driving shaft actuated by at least one of said wheels; means free to turn about said shaft as an axis for driving said first mowers therefrom; driving means for the third mower arranged to permit rotation of the same about two axes at right angles to each other; with means for maintaining the reel shafts of the mowers at all times in substantially parallel vertical planes.

7. The combination in a mowing machine of driving wheels; two mowers substantially in line with each other and spaced apart; a third mower to the rear of the space between said first mowers; a rigid structure connected to the opposite ends of each mower and free to turn about two axes at right angles to each other; means for actuating the mowers from at least one of the driving wheels including shafts respectively extending through and journaled in said structure for each mower; with means for maintaining said mowers with the axes of their reels in substantially parallel vertical planes.

8. The combination in a mowing machine of a pair of wheels; a frame carried thereby; a transversely extending shaft driven from at least one of said wheels; a casing rotatably mounted on said shaft; a mower attached to said casing and carried partly by the same and partly by its own grass roller; two other mowers substantially in line with each other; rotatably mounted casings respectively connected to said latter mowers and each supporting a portion of the weight of its mower while causing the remainder of such weight thereof to be carried by its own grass roller; with means extending through the casings for actuating the several mowers from the driving shaft.

9. The combination in a mowing machine of supporting wheels; a frame carried thereby; a driver's seat on said frame; a plurality of mowers each supported partly by its own grass roller and partly by said frame; with means for driving the cutting mechanism of the mowers from at least one of said supporting wheels.

10. The combination of a pair of wheels; a frame carried thereby; two mowers with their reels substantially in line with each other; a third mower; means for driving the mowers from at least one of the wheels; a driver's seat mounted on the frame over the third mower; and means for supporting a portion of the weight of each mower from the frame while causing the remainder of such weight to be carried by its own grass roller.

11. The combination in a mowing machine of at least one pair of supporting wheels; a main frame structure carried thereby; a plurality of at least three mowers; a rigid frame connecting each of the mowers to the main frame structure and free to turn thereon in two lines at right angles to each other while being maintained in substantially parallel vertical planes; with means for driving the cutting mechanism of said mowers.

12. The combination in a mowing machine of at least one pair of supporting wheels; a main frame structure carried thereby; a plurality of at least three mowers; a rigid frame connecting each of the mowers to the main frame structure and free to turn thereon in two lines at right angles to each other while being maintained in substantially parallel vertical planes; means for driving said mowers; and means for causing a portion of the weight of each mower to be carried by its own grass roller and the remainder of said weight to be carried by the main frame.

13. The combination in a mowing machine of a transverse driving shaft; a casing rotatable on said shaft; a second casing rotatably connected to said first casing and free to turn in a plane parallel to said shaft; a mower connected to said second casing; and driving mechanism extending through said two casings between the shaft and the cutting element of the mower.

14. The combination in a mowing machine of a transverse driving shaft; a casing rotatable on said shaft; a second casing rotatably connected to said first casing and free to turn in a plane parallel to said shaft; a mower connected to said second casing; driving mechanism extending through said two casings between the shaft and the cutting element of the mower; with a device for bodily turning the mower about said shaft as an axis.

15. The combination in a mowing machine of a pair of wheels; a frame structure carried thereby; a shaft driven from at least one of the wheels; a casing rotatably mounted on the shaft; a second casing rotatably mounted on the first casing; a mower supported partly by the second casing and partly on its own grass roller; with means extending through said casings for driving the cutting element of the mower from said shaft.

16. The combination in a mowing machine of wheels; a shaft actuated by at least one of said wheels; a frame structure; a plurality of casings rotatable on parallel horizontal axes and supported on said frame structure; other casings respectively rotatable upon said first casings; mowers respectively connected to said second casings; with driving means connecting the shaft with the cutting elements of the mowers.

17. The combination in a mowing machine of a pair of wheels; a main shaft actuated by at least one of said wheels; a plurality of mowers each having a side casing; structures supported to be rotatable about the main shaft as an axis and respectively connected to the casings, said structures being free to turn on axes lying in planes in right angles to said shaft; with mechanism extending through said structures and casings for driving the cutting elements of the mowers from the shaft.

18. The combination in a mowing machine of a pair of wheels; a shaft actuated by at least one of said wheels; a gear case rotatably mounted on the shaft; a second gear case rotatable on the first gear case on an axis at right angles to said shaft; a mower rigidly connected to said second gear case; gears in said gear cases; and shafts coöperating with said gears to transmit power from the main shaft to the cutting mechanism of the mower.

19. The combination in a mowing machine of a pair of wheels; a main shaft driven by at least one of said wheels; a plurality of gear casings rotatably mounted on said shaft; rigid frames each including a gear casing rotatably connected to said first casings respectively; mowers rigidly connected to said frames; and mechanism extending through each set of gear casings and frames for transmitting power from the driving shaft to the respective mowers.

20. The combination in a mowing machine of a driving shaft; a gear casing rotatable thereon and including a projecting sleeve; a frame including a second gear casing having a sleeve rotatable concentrically with said first sleeve; a mower connected to said second gear casing; and means extending through said casings and sleeves for transmitting power between said shaft and the cutting element of the mower.

21. The combination in a mowing machine of a pair of wheels; a driving shaft rotatable by and extending between said wheels; a frame carried by said wheels; a mower carried partly by its own grass roller and partly by said frame; with incased mechanism connecting the driving shaft with the cutting element of said mower.

22. The combination in a mowing machine of a pair of wheels; a rigid structure rotatably supported by and connecting said wheels; a plurality of mowers connected to and each free to rotate coaxially with said structure and also each free to turn on an axis at right angles to the axis of said structure; with means for driving the cutting elements of the mowers.

23. The combination in a mowing machine of a pair of wheels; a rigid frame supported by and connecting said wheels; a driving shaft extending through the frame between the wheels; a casing structure rotatably connected to said frame; a mower connected to said casing structure so as to be propelled thereby substantially independently of the shaft; with means for driving the cutting mechanism of said mower from the shaft.

24. The combination in a mowing machine of a pair of wheels; a rigid frame extending between and supported by said wheels; a shaft supported by said frame and driven by the wheels; a casing rotatable on the frame; a mower having a frame structure connected to said casing so as to be free to turn on an axis at right angles to the shaft; and means for driving said mower from the shaft.

25. The combination in a mowing machine of a pair of wheels; casing structures carried by the wheels and providing bearings; a rigid frame journaled in said bearings and extending between said wheels; a shaft supported by the frame and driven by the wheels; a plurality of mowers of which certain are on opposite sides of said frame; means for connecting the mowers to the frame to permit their rotation about the shaft as an axis; and means for driving the cutting mechanism of the mowers from said shaft.

26. The combination in a mowing machine, of a pair of wheels; a main shaft and connections between the same and said wheels, and actuated by at least one of said wheels; and a plurality of mowers supported from the shaft and operatively connected thereto, said mowers being free to turn in planes parallel to the shaft and also each free to turn about the center line of the shaft in accommodating itself to unevennesses of the ground surface.

27. A gang mower comprising a plurality of ground engaging wheels, a rotary shaft, gearing driven by each of said wheels and driving said shaft, a plurality of individual rotary cutter mechanisms driven in common from said shaft, means allowing pivotal movement of each of said cutter mechanisms about said shaft, and means allowing lateral rocking of said cutter mechanisms.

SAMUEL PERCY TOWNSEND.

Copies of this patent may be obtained for five cents each, by addressing the "Commissioner of Patents, Washington, D. C."